No. 859,519.
PATENTED JULY 9, 1907.
B. REICHELT.
DRIVING BELT AND ROPE.
APPLICATION FILED MAR. 21, 1902. RENEWED FEB. 26, 1904.
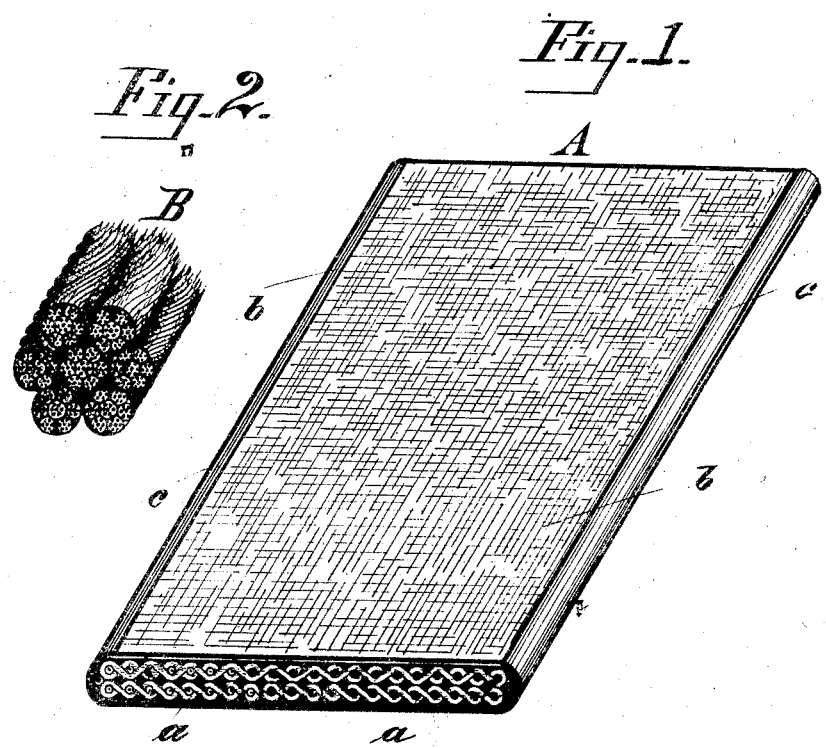
WITNESSES:
INVENTOR
Bruno Reichelt.
BY
ATTORNEYS

UNITED STATES PATENT OFFICE.

BRUNO REICHELT, OF HOBOKEN, NEW JERSEY, ASSIGNOR TO CHALLENGE BELT CO., OF WEST HOBOKEN, NEW JERSEY, A CORPORATION OF NEW JERSEY.

DRIVING BELT AND ROPE.

No. 859,519. Specification of Letters Patent. Patented July 9, 1907.

Application filed March 21, 1902. Renewed February 26, 1904. Serial No. 195,430.

*To all whom it may concern:*

Be it known that I, BRUNO REICHELT, a citizen of the United States, residing at Hoboken, in the county of Hudson and State of New Jersey, have invented certain new and useful Improvements in Driving Belts and Ropes; and I do hereby declare the following to be a full, clear, and exact description of the invention, such as will enable others skilled in the art to which it appertains to make and use the same.

My invention relates to driving belts or ropes, and its object is to improve that class of driving belts which are woven into a fabric from hemp, cotton, flax or other material.

In carrying out my invention, I aim to provide a strong, water-proof, non-stretchable belt and increase its adhesiveness so that it is impossible for it to slip upon the pulley, and with these ends in view the improvement consists in impregnating the interstices with a heated solution which is afterwards removed from the outer surfaces by subjecting the belt to pressure between rolls; then impregnating the outer surfaces with a second solution, then covering the outer side with a substance to give it a leatherlike appearance and render it water-proof, and finally filling the interstices of the edges with a material which gives it rigidity at those places to enable it to stand the strain brought to bear by shifting from the driving pulley to the idler.

In the accompanying drawings which illustrate my improvement: Figure 1 is a perspective of a portion of the belt. Fig. 2 is a perspective of a portion of a driving rope treated in the same way as the belt.

In the drawings, A designates the belt and B the rope. The belt may be of any thickness and the ends of the interior warp threads and the weft or cross threads are shown at *a* while *b* and *c* indicate the outer or upper side and stiffened edges respectively.

In making the belt the same is first subjected to the action of a, solution of 500 parts of black stearin pitch, 80 parts of rosin free from acid and 20 parts of caoutchoucin which is a substitute for caoutchouc composed of a mixture of oil and rosin partly dissolved in ether or alcohol. This solution is heated, and the belt is passed through it so that the interstices *a* are thoroughly impregnated therewith, when the belt is passed between rollers to remove the solution from the outer surfaces and then stretched and trued in a suitable machine. When the above fluid has cooled and hardened the outer surfaces are impregnated with a solution of 3 parts of caoutchoucin, 1 part alcohol and 1 part of black soot. This strengthens the belt without destroying its flexibility, and increases its tenacity, so that its liability to slip on the pulley is obviated. After the above solution is dry and hard the upper or outer surface is covered with a mixture of 2 parts caoutchoucin, 1 part alcohol and 1 part of mixed yellow and red ocher. This renders the belt water-proof, and gives it a leather-like appearance.

By the constant shifting of the belt from the driving pulley to the idler, the edges frequently become stretched and sag, and to obviate this I fill the interstices, at the edges, with a solution of 1 part caoutchoucin, 1 part alcohol, 2 parts shellac and 1 part black soot.

Although this process is more particularly adapted for driving belts, I do not wish to confine myself to such use alone as numerous articles made from felt or coarse fabric may be similarly treated, and in Fig. 2 I have shown a driving rope composed of a plurality of strands treated by this process.

Having thus described my invention, what I claim and desire to secure by Letters Patent is:

1. The herein described method of treating fabric, which consists in immersing and impregnating the interstices with a hot solution, then subjecting the fabric to pressure between rolls while the solution is still hot and removing the surplus from the surfaces of the fabric, then passing the fabric across a space in which the solution may cool and harden, then treating the surfaces of the fabric with a second solution, passing the fabric across another space, and then treating the outer surfaces with a third material to give a finish to its surface.

2. The herein described method of treating fabric, which consists in immersing and impregnating the interstices with a heated solution, then subjecting the fabric to pressure between rolls while the solution is still hot and removing the surplus from the surfaces of the fabric, then cooling the fabric to permit the solution to cool and harden, then treating the surfaces of the fabric with a second solution, then drying and hardening the surfaces, and then treating the outer surface with a third solution to render it leather-like.

3. The herein described method of treating driving belts which consists in subjecting the belt to the action of a heated solution of black stearin pitch, rosin and caoutchoucin, then removing the solution from the outer surfaces by presser rolls, then covering the outer surfaces with a solution to render the belt water-proof and non-stretchable.

4. The herein described method of treating driving belts which consists in subjecting the belt to the action of a heated solution of black stearin pitch, rosin and caoutchoucin, then removing the solution from the outer surfaces by presser rolls, then impregnating the outer surfaces with a solution of caoutchoucin, alcohol and black soot, and then covering the outer side and edges with solutions to render them water-proof, leather-like and non-stretchable.

5. The herein described method of treating driving belts which consists in subjecting the belt to the action of a heated solution of black stearin pitch, rosin and caoutchoucin, then removing the solution from the outer surfaces by presser rolls, then impregnating the outer surfaces with a solution of caoutchoucin, alcohol and black soot, and then covering the outer side with a solution of caoutchoucin, alcohol, and a mixture of yellow and red ocher, and finally impregnating the interstices at the edges with a solution to prevent stretching.

6. The herein described method of treating driving belts which consists in subjecting the belt to the action of a heated solution of black stearin pitch, rosin and caoutchoucin, then removing the solution from the outer surfaces by presser rolls, then impregnating the outer surfaces with a solution of caoutchoucin, alcohol and black soot, and then covering the outer side with a solution of caoutchoucin, alcohol, and a mixture of yellow and red ocher, and finally impregnating the interstices at the edges with a solution of caoutchoucin, alcohol, shellac and black soot.

In testimony whereof I affixed my signature, in presence of two witnesses.

BRUNO REICHELT.

Witnesses:
M. HELLING,
GEORGE F. SEYMOUR, Jr.